3,177,787
PHOTOGRAPHIC SHUTTER
Franz Singer, Munich, Germany, assignor to Compur-Werk G.m.b.H. & Co., Munich, Germany, a firm of Germany
Filed Feb. 7, 1962, Ser. No. 171,710
Claims priority, application Germany, Feb. 8, 1961, C 23,370
9 Claims. (Cl. 95—63)

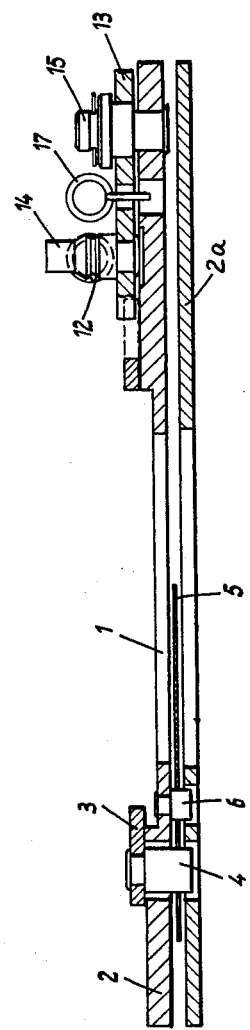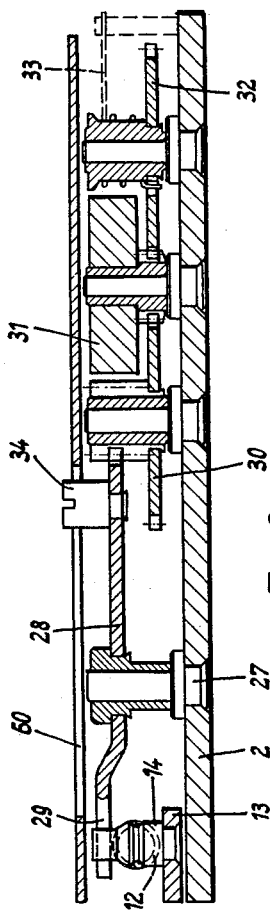

This invention relates to a photographic shutter, and more especially to a shutter of what is sometimes called the "set" type as distinguished from the "automatic" type, meaning thereby that the driving spring means of the shutter is set or tensioned or cocked as a separate act prior to the release or tripping or triggering of the shutter to make an exposure. In modern shutters of the set type, the setting or tensioning or cocking of the shutter is frequently accomplished by the film transport or film advancing mechanism, and this may be true of the shutter of the present invention, if desired.

An object of the present invention is the provision of a generally improved and more satisfactory shutter, especially one of the set or cocking type.

Another object is the provision of a simplified shutter having a few parts as compared with shutters of the prior art having the same capabilities.

Still another object is the provision of a shutter so designed as to have reduced friction and wear as compared with prior shutters.

A further object is the provision of an improved shutter having a flat space-saving design.

A still further object is the provision of a shutter so designed as to give increased reliability of control of the exposure time, and also one capable of operating with great accuracy at extremely short exposure times.

Another object is the provision of an improved, simple, and efficient shutter having first spring means for opening the shutter, and separate spring means for closing the shutter.

These and other desirable objects may be attained in the manner disclosed as an illustrative embodiment of the invention in the following description and in the accompanying drawings forming a part hereof, in which:

FIG. 2 is a section taken approximately on the line II—II of FIG. 1;

FIG. 3 is a section taken approximately on the line III—III of FIG. 1;

FIG. 4 is a view similar to a fragment of FIG. 1, illustrating a modified construction incorporating a switch or contact for flash actuation in synchronism with the operation of the shutter;

Figure 1:
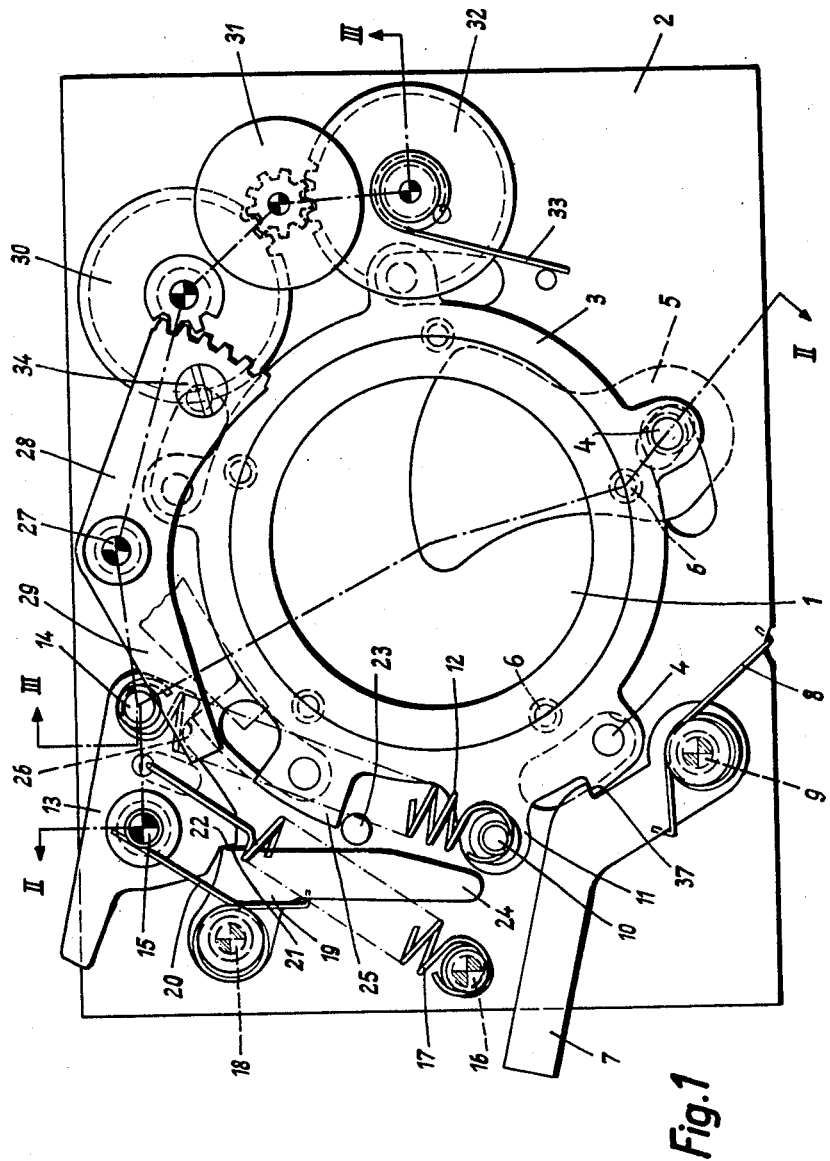
FIG. 1 is a face view or front elevation of a shutter in accordance with a preferred embodiment of the invention, in cocked or tensioned position, with cover parts and certain other parts omitted for the sake of simplicity and clarity.

Referring first to the embodiment shown in FIGS. 1–3, the shutter comprises a main base plate 2 of any desired shape, having an exposure aperture 1. The optical axis of the associated lenses (not shown) extends centrally through the exposure aperture, as usual.

In this embodiment of the invention, the shutter is of the segmental blade type, and the blade actuating member is in the form of a blade ring 3 mounted for rotation on the base plate 2 about the optical axis as a center. Conventional pins 4 on the blade ring 3 engage in conventional slots in the shutter blades 5 which are pivoted for oscillating movement on the pivots 6 fixed in the base plate 2. The shutter has any desired number of these blades 5, as well understood in the art, usually about five blades being used, only one of which is shown in the drawings for the sake of simplicity. The various shutter blades swing in the conventional way on their pivots 6 from positions where they collectively serve to close the exposure aperture 1, to their fully open positions wherein the exposure aperture is uncovered. The blades work in the thin space between the main base plate 2 and a second plate 2a (FIG. 2) spaced slightly from it.

A release lever or trigger 7 is urged by a torsion spring 8 to swing in a clockwise direction on the fixed pivot 9. In its normal latched position, a nose or projection on the trigger lever 7 engages a nose or projection 37 on the blade ring 3 and holds this blade ring in its extreme counterclockwise position, wherein the shutter blades 5 are closed.

The blade ring 3 carries a pin 10 fixed to a radial lug 11 projecting from one side of the blade ring. The shutter opening spring 12 has one end connected to this pin 10, and its other end is connected to a pin 14 fixed to a lever 13 mounted to swing on a pivot 15 on the main base plate 2. The lever 13 serves both as a cocking or tensioning member and as a blade closing member, and may be referred to by either or both of these names. Another pin 16 fixed to the base plate 2 serves to anchor one end of a blade closing spring 17, the opposite end of which is secured to the lever 13 between the pin 14 and the pivot 15 so that the force of the spring 17 tends to swing lever 13 in a clockwise direction on its pivot 15.

Such motion of the lever 13 is initially prevented by a latching pawl 19 pivoted to swing on a fixed pivot 18 on the base plate 2, and influenced by a biasing spring 20 which constantly tends to turn the latching pawl 19 in a counterclockwise direction on its pivot 18, tending to keep the tooth 21 of the latching pawl engaged with a cooperating tooth 22 on the lever 13. When the teeth 21 and 22 are fully engaged, one edge of the latching pawl 19 bears against a fixed stop pin 23 mounted on the base plate 2, which serves to limit the swinging of the latching pawl in a counterclockwise direction under the influence of its spring 20, the pawl being shown very slightly displaced from this position in FIG. 1. The latching pawl 19 has an arm 24 lying in the path of travel of the lug 11 on the blade ring 3, so that as the blade ring 3 moves in a counterclockwise direction, to open the shutter blades 5, the lug 11 engages the arm 24 and releases the latch 19, swinging the tooth 21 thereof out of engagement with the tooth 22 of the lever 13 just as the blade ring 3 reaches its extreme clockwise position, with the blades fully open. In this extreme clockwise position of the blade ring, the lug 11 thereon engages the fixed stop pin 23, and unless otherwise restrained it tends to bounce back or rebound from this fixed pin 23, thus assisting the immediate quick closing of the shutter blades during exposures of the shortest duration.

In addition to the lug 11, the blade ring 3 also carries a radially projecting lug 25. The counterclockwise edge of this lug 25 lies against or very close to the fixed stop pin 23 when the blade ring 3 is in its extreme counterclockwise position (shutter blades closed) whereas the clockwise edge of this lug 25 is in position to make contact with an abutment portion or engaging portion of the lever 13. when the blade ring 3 turns to its extreme clockwise position (shutter blades fully open).

From what has been said above, it will be apparent to those skilled in the art that when the trigger or release member 7 is moved in a counterclockwise direction on its pivot 9, to release the latching nose thereof from the latching shoulder 37 on the blade ring, the shutter opening spring 12 can then pull the blade ring 3 in a clockwise direction, opening the shutter blades. As the blades reach fully open position, the lug 11 on the blade ring displaces the arm or tail 24 of the latch 19 sufficiently far so that the latching tooth 21 thereof is disengaged from the latching tooth 22 of the member 13, and concomitantly therewith the forward or clockwise edge of the lug 25 engages the abutment face 26 of the lever 13, and the lug 11 of the blade ring engages and tends to rebound from the fixed pin 23. The disengagement of the latching teeth 21, 22 then allows the blade closing spring 17 to begin to turn the lever 13 in a clockwise direction on its pivot 15, so that the abutment portion 26 of the lever 13, bearing on the lug 25, moves the blade ring 3 back in a counterclockwise direction to close the shutter blades, moving it far enough so that the blade ring is once again latched by the trigger latch member 7. During this return movement or closing movement, the spring 12 still pulls in a clockwise direction on the blade ring 3, but it pulls with equal force in the opposite direction on the lever 13, and since the lever 13 is in tight engagement or contact with the lug 25 on the blade ring 3, the spring 12 is actually ineffective on the blade ring 3 in either direction, so long as the abutment 26 remains in contact with the lug 25. Therefore the closing of the shutter blades is performed by the force of the spring 17, and the spring 12 exerts no external force on the blade ring.

Retarding mechanism is provided for enabling exposures to be made at less than the maximum speed; that is, slower than the fastest speed possible with the shutter. The retarding mechanism comprises a retarding lever 28 mounted on a fixed pivot 27 on the base plate 2. According to the selected time of exposure, an arm 29 on the lever 28 projects more or less into the path of movement of the pin 14 on the cocking lever 13. During the deflection of the lever 13, the pin 14 rides along the edge of the arm 29 of the retarding lever 28, and deflects this arm 29 in a counterclockwise direction on its pivot 27. This deflection continues until the edge of the arm 29 is parallel with the path of deflection or movement of the pin 14; that is, until the engaged edge of the arm 29 is tangent to the arc along which the pin 14 is moving, around the pivot 15 as a center. When the deflection of the arm 29 has reached this point, further movement of the pin 14 around the pivot 15 as a center does not cause any further deflection of the retarding lever arm 29, so that the pin 14 may then continue its movement freely without further retardation or braking effect caused by the retarding lever 28, 29.

The retarding lever 28 has gear teeth which mesh with the teeth of a pinion fixed to a gear wheel 30, the wheel in turn meshing with a pinion fixed to a flywheel 31, and the same pinion engages a gear 32. These parts collectively form a retarding gear train as well known in the art. A light restoring spring 33, wound around the hub of the gear 32, tends to restore the gear train to its initial position when it has been displaced therefrom, and tends to move the retarding lever 28, 29 in a clockwise direction to the limit of its motion.

The initial or starting position of the retarding mechanism is controlled by a pin 34 on the lever 28, which pin engages the cam edge of a timing cam 60 (FIG. 3) which, like the familiar timing cam of a conventional shutter, engages one side of the pin 34 to control the initial position of the lever 28 and thus to control the extent to which it projects into the path of travel of the pin 14, at the beginning of the exposure. For the sake of accurate adjustment or calibration of the retarding effect of the retarding mechanism with respect to the shape of the cam 60, the control pin 34 is preferably made eccentric, as well seen in FIGS. 1 and 3, so that by slightly turning the pin in one direction or the other, the relation of the lever 28 to the control cam 60 is slightly altered.

In FIGS. 1–3, the shutter is shown approximately in its cocked or tensioned or set position, ready for an exposure. Moving the release lever or trigger lever 7 in a counterclockwise direction serves to release the latching tooth 37 of the blade ring 3 from the release lever, so that the opening spring 12 can now act on the blade ring 3 to move it in a clockwise direction, opening the shutter blades so that the exposure aperture becomes fully uncovered. As already explained, approximately at the end of the opening movement of the blade ring, the lug 11 thereon deflects the arm 24 of the latching pawl 19 sufficiently far to release the lever 13, and concomitantly with this, the forward advancing edge of the lug 25 on the blade ring comes into contact with the abutment portion 26 of the lever 13, and the lever 13 starts to turn in a clockwise direction on its pivot 15, under the influence of the closing spring 17. For the fastest exposures, the retarding lever 28, 29 will have been placed in a position completely out of the path of travel of the pin 14, as shown in broken lines in FIG. 1, so that the retarding mechanism will not delay the immediate rebound and return motion of the blade ring. For progressively longer and longer exposures, the retarding arm 29 will have been positioned (by the action of the cam 60 on the pin 34) so as to lie to a greater or lesser extent across the path of travel of the pin 14. Hence the pin 14, either at the very beginning of its motion or after a short initial movement (depending upon the exact initial position of the arm 29) will engage the edge of the arm 29 and will deflect this arm, overcoming the resistance caused by the retarding gear train 30, 31, 32. Thus the motion of the pin 14 and lever 13 will be braked or retarded until the pin 14, traveling in its arc, reaches the point where the direction of its travel is parallel to the edge of the arm 29. The closing movement of the shutter blades does not actually begin until this time, as previous to this time the shutter blades lay outside of the exposure aperture and were travelling toward the exposure aperture but not actually entering and beginning to cover the exposure aperture.

The deflection of the retarding arm 29 being completed at just about the time that the shutter blades begin to cover the outer edges of the exposure aperture, the cocking lever or closing lever 13 can now complete its movement in a clockwise direction, so that the abutment 26 thereon moves the blade ring 3 to the counterclockwise limit of its motion, where it is once again latched by engagement of the release member or trigger member 7 with the latching nose 37. The reversal of the movement of the blade ring 3 at the end of its opening movement is substantially quickened by the rebound or bounce caused by the lug 11 striking the pin 23.

If it is desired to synchronize the shutter for flash synchronization of the "X" type, this may be done in the manner shown in FIG. 4. The synchronized form of shutter is otherwise the same as that shown in FIGS. 1–3, except for the slight differences now to be described.

There is an electric contact pin 35 mounted on the base plate 2 but insulated therefrom by the insulating material schematically shown at 35a. The spring 20 of the latching pawl 19 has one arm extended as at 20a, this arm bearing against a pin 36 fixed to the pawl 19, instead of being wrapped around the edge of the pawl as in FIG. 1. It will be remembered, from the description of the previous construction, that during the clockwise rotation of the blade ring 3, while opening the shutter blades, the lug 11 thereon engages and displaces the pawl 19, completing the unlatching of this pawl (to release the lever 13) just about at the end of the clockwise motion of the blade ring, when the shutter blades are fully open. In the present synchronized construction, this same releasing movement of the pawl 19, completed just as the blades became fully opened, serves to swing the arm 20a of the spring 20 into contact with the pin 35, making electrical contact therewith and closing the electric circuit, one side of which is connected to the pin 35 and the other side of which is connected to the base plate 2. The circuit may be of the conventional kind, leading through any suitable conductor connections to the flash apparatus. Thus it is seen that the switch is closed (by engagement of the arm 20a with the pin 35) just as the shutter blades reach their fully open position, thereby producing flash contact synchronization of the so-called "X" type.

Figure 6:
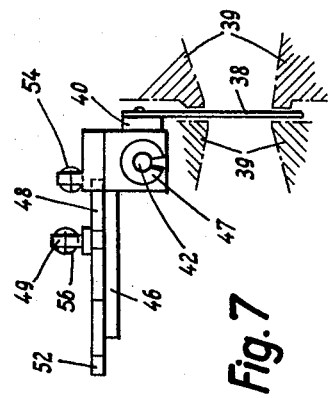
FIG. 6 is a plan of the embodiment according to FIG. 5.
Figure 7:
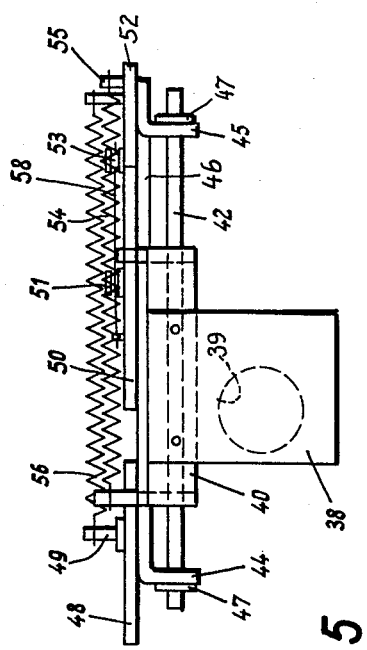
FIG. 7 is a side elevation of the embodiment according to FIGS. 5 and 6, with additional parts shown schematically in axial section.
Figure 5:
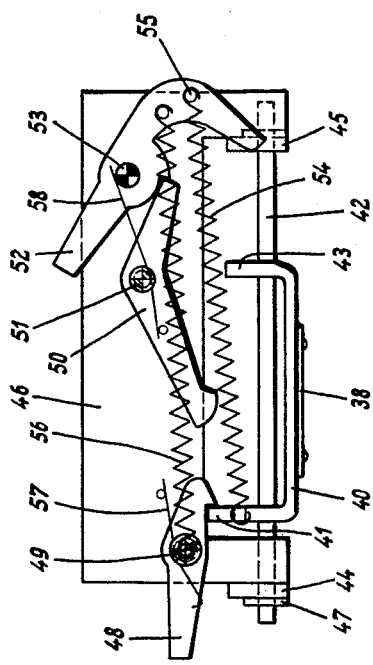
FIG. 5 is a front elevation of a shutter in accordance with another embodiment of the invention.

An alternative embodiment of the invention is illustrated in FIGS. 5–7, this shutter also being illustrated in its cocked or tensioned position. The invention is here shown as applied to a shutter of the single blade reciprocating type, to indicate that the basic features of the invention are applicable to a single blade shutter or to a reciprocating shutter, just as well as to a shutter of the multiple pivoted blade type shown in FIG. 1.

The single reciprocating shutter blade is illustrated at 38. It is slidable between guides 39 through which the exposure aperture extends, and the blade is affixed to a reciprocating slide 40 which has two arms 41 and 43 slidable on any suitable guide such as the rod 42 which is mounted between two lugs or arms 44 and 45 formed on a base plate 46. The guide rod 42 is axially secured in these arms by split rings 47.

A release lever or trigger member 48 is pivoted at 49 to the base plate 46, and is influenced by a spring 57 tending to keep the latching nose of the trigger member in latching engagement with one end of the arm 41 of the reciprocating slide 40. The latching pawl 50 is pivoted to the base plate at 51, and influenced by its biasing spring 58 which tends to keep a latching tooth on the lever 50 in latching engagement with a latching tooth on the cocking lever or closing lever 52 which is pivoted to the base plate by the pivot 53.

A shutter opening spring 54 has one end secured to the arm 41 of the reciprocating slide 40, and the other end secured to a pin 55 on the combined cocking and closing member 52. The shutter closing spring 56 has one end secured to a second pin on the member 52, and the other end secured to any suitable fixed point on the base plate 46, such as the pivot 49, for example.

The operation of this form of the invention will probably be obvious to those who already understand the foregoing disclosure of the first form of the invention. Assuming that the shutter is in its cocked or set position as shown in FIGS. 5 and 6, the exposure is made by actuating the trigger member or release member 48, so that the nose thereof releases the arm 41 of the reciprocating slide 40. The opening spring 54 then pulls the slide 40 in a rightward direction when viewed as in FIGS. 5 and 6, moving the shutter blade 38 to the right to uncover the exposure aperture.

Close to the end of its rightward movement, the arm 41 on the slide engages the leftward arm of the latching pawl 50, and turns this pawl slightly in a clockwise direction on its pivot 51. Then the arm 43 of the slide strikes against the lug 45, which serves as a limit stop and also as a rebound member to help the slide 40 to rebound quickly toward its shutter-closing position.

The actuation of the latching pawl 50 by the arm 41 on the slide 40 serves to allow the cocking and closing member 52 to swing clockwise on its pivot 53 under the influence of the closing spring 56. This movement begins just as the slide 40 reaches the rightward limit of its motion, so that the bent end or operating end of the member 52 engages with the arm 43 on the slide, and the clockwise turning of the member 52 causes the bent end to push leftwardly on the arm 43, to move the slide back in a leftward or shutter-closing direction. The shutter is thus closed again, and at the end of its closing motion, the arm 41 of the slide becomes latched once more by the nose of the release member or trigger member 48.

Before making the next exposure, the member 52 must once more be reset or tensioned, by moving it in a counterclockwise direction until it is latched by the latch 50, in the set position shown in FIG. 6.

The motion of the member 52 in a clockwise direction, at the beginning of the return or shutter-closing movement, can be controlled by retarding mechanism in a manner analogous to that described in conneciton with FIGS. 1–3.

From these embodiments above disclosed, it will be seen that a shutter in accordance with this invention has only a restricted number of movable parts, mostly of relative flat shape, which therefore take up relatively little space. The small number of movable parts and the direct action of the driving springs upon the blade actuating member, lead to a substantial reduction of friction and very high shutter speeds can thus be achieved.

The employment of separate opening and closing spring permits the designer, at his discretion, to select the cocking or set position of the cocking or tensioning lever which serves also as the driving member for returning the shutter blade or blades to closed position. Thus, within wide limits, the length of the retarded path of this member can be arbitrarily chosen to produce the best results. This is in contrast to prior forms of shutter construction, where the length of the retarded path of the operating member is a fixed quantity in the kinematic diagram, determined by the peculiarities of the particular design (for instance, a crank, a link, or a crank-slide motion). But in the present construction, the length of the retarded path which is to be retarded by the retarding gear mechanism can be indepedently chosen by the shutter designer, and this permits a simple form of construction for the retarding gearing, since a sufficiently long retardation path enables precise retarding times to be achieved by simple means.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter comprising at least one blade, a blade actuating member movable in one direction to open said blade and movable reversely in the opposite direction to close said blade, a first latch for holding said actuating member in a blade-closed position, an operating member movable from a first position to a second position and effective during such movement to engage said actuating member to move the actuating member from blade-open position to blade-closed position, a second latch for holding said operating member in its said first position, an opening spring connected to both said actuating member and said operating member and exerting force on both of them in directions tending to move said actuating member toward blade-open position and tending to move said operating member toward its said second position, a closing spring operatively connected to said operating member to tend to move it toward its second position, and means operated by movement of said actuating member for releasing said second latch substantially when said actuating member reaches a fully blade-open position, so that said operating member may then move toward its second position under the influence of said closing spring, to move said actuating member back to blade-closed position.

2. A cockable photographic shutter comprising at least one blade mounted for a to and fro movement between a closed position and an open position, an actuating member operatively connected to said blade to move it to and fro, a cocking lever movable between a tensioned position and a run-down position, said cocking lever during its movement toward run-down position making contact with said actuating member and serving to drive said actuating member toward blade-closed position, a first driving spring connected both to said actuating member and to said cocking lever to tend to move them into contact with each other and thereby tending to move said actuating member toward blade-open position and to move said cocking lever toward run-down position, a second driving spring also tending to move said cocking lever toward run down position, a releasable first latch for holding said actuating member in blade-closed position against the force of said first driving spring, a releasable second latch for holding said cocking lever in tensioned position against the force of both of said springs, and a part on said actuating member for engaging and releasing said second latch substantially when said actuating member reaches the end of its movement in a blade-opening direction, so that said cocking lever may then move toward its run down position under the influence of said second spring, thereby to close the shutter.

3. A construction as defined in claim 2, further comprising stops cooperating with said actuating member to limit the blade opening and closing movements thereof, the stop which limits the blade opening movement being a fixed stop.

4. A construction as defined in claim 2, further comprising stops cooperating with said actuating member to limit the blade opening and closing movements thereof, the stop which limits the blade opening movement being a fixed stop from which the actuating member rebounds resiliently to accelerate the closing movement.

5. A construction as defined in claim 2, further including retarding gear mechanism to control the exposure time, said gear mechanism including a member which projects by an adjustable amount into the path of movement of a part on said cocking lever.

6. A construction as defined in claim 2, further including flash contact switch means operated by movement of said second latch.

7. A construction as defined in claim 2, further including a spring biasing said second latch toward latching position, an electric contact member insulated from said biasing spring, an an extension on said biasing spring for engaging said contact member to make electrical contact therewith when said second latch is moved to unlatched position, said biasing spring and said contact member together constituting a flash synchronization switch.

8. A construction as defined in claim 1, in which said blade is mounted for pivoted oscillating movement.

9. A construction as defined in claim 1, in which said blade is mounted for rectilinear reciprocating movement.

References Cited by the Examiner
UNITED STATES PATENTS

| | | | |
|---|---|---|---|
| 1,397,669 | 11/21 | Wollensak | 95—63 |
| 1,678,179 | 7/28 | Brueck | 95—55 |
| 2,275,807 | 3/42 | Philips | 95—55 |
| 2,782,698 | 2/57 | Hill | 95—63 |
| 2,890,640 | 6/59 | Noack | 95—63 |

NORTON ANSHER, *Primary Examiner.*

JOHN M. HORAN, *Examiner.*